United States Patent
Cedrone et al.

(10) Patent No.: US 6,782,633 B1
(45) Date of Patent: Aug. 31, 2004

(54) FLEXIBLE GUIDE FOR IDENTIFYING A MOUNTING HOLE

(76) Inventors: Daniel Pompei Cedrone, 17016 Knoxwood Dr., Huntersville, NC (US) 28078; Mark Reynolds Pace, 3008 Maywood Rd., Roanoke, VA (US) 24014

(*) Notice: Subject to any disclaimer, the term of this patent is extended or adjusted under 35 U.S.C. 154(b) by 0 days.

(21) Appl. No.: 10/627,130

(22) Filed: Jul. 24, 2003

(51) Int. Cl.[7] .................................................. G01B 3/02
(52) U.S. Cl. ................................................ 33/613; 33/562
(58) Field of Search ........................... 33/613, 645, 562, 33/563, 566, 483, 492

(56) References Cited

U.S. PATENT DOCUMENTS

| | | | |
|---|---|---|---|
| 3,516,165 A | | 6/1970 | Pfeffer |
| 4,220,309 A | | 9/1980 | Eisen et al. |
| 4,336,884 A | | 6/1982 | Hart et al. |
| 4,384,648 A | | 5/1983 | Hart et al. |
| 4,517,860 A | | 5/1985 | Dameron, Jr. |
| 4,998,355 A | * | 3/1991 | Greene .................... 33/562 |
| 5,129,154 A | | 7/1992 | Aydelott |
| 5,180,135 A | | 1/1993 | Hindall |
| 5,209,449 A | | 5/1993 | Hart |
| 5,303,895 A | | 4/1994 | Hart |
| 5,361,510 A | * | 11/1994 | Cox ........................ 33/613 |
| 5,454,542 A | | 10/1995 | Hart |
| 5,459,936 A | * | 10/1995 | Stange .................... 33/563 |
| 5,471,760 A | | 12/1995 | Farris |
| 5,509,213 A | | 4/1996 | Kelly et al. |
| 6,032,378 A | * | 3/2000 | Null ........................ 33/613 |
| 6,049,991 A | | 4/2000 | Gruenberg et al. |
| 6,421,928 B1 | | 7/2002 | Miller |
| 2002/0124426 A1 | | 9/2002 | Dewberry |

* cited by examiner

Primary Examiner—Christopher W. Fulton
(74) Attorney, Agent, or Firm—Summa & Allan, P.A.

(57) ABSTRACT

An apparatus for identifying a mounting hole on a wall surface comprises in one embodiment a flexible guide having a first section and a second section that are connected at one end, a tab for connecting free ends of the guide when the first and second sections are extended against one another, an elongate slit, and a pair of alignment openings that correspondingly align when the first and second sections are extended against one another to thereby identify an alignment reference point. A method for marking a wall surface to identify a mounting hole for an article to be hung comprises in one embodiment the steps of supporting an article with the flexible guide, releaseably securing free ends of the guide to one another, positioning the guide and article against a desired wall surface, and identifying the mounting hole with reference to an alignment reference opening in the guide.

42 Claims, 2 Drawing Sheets

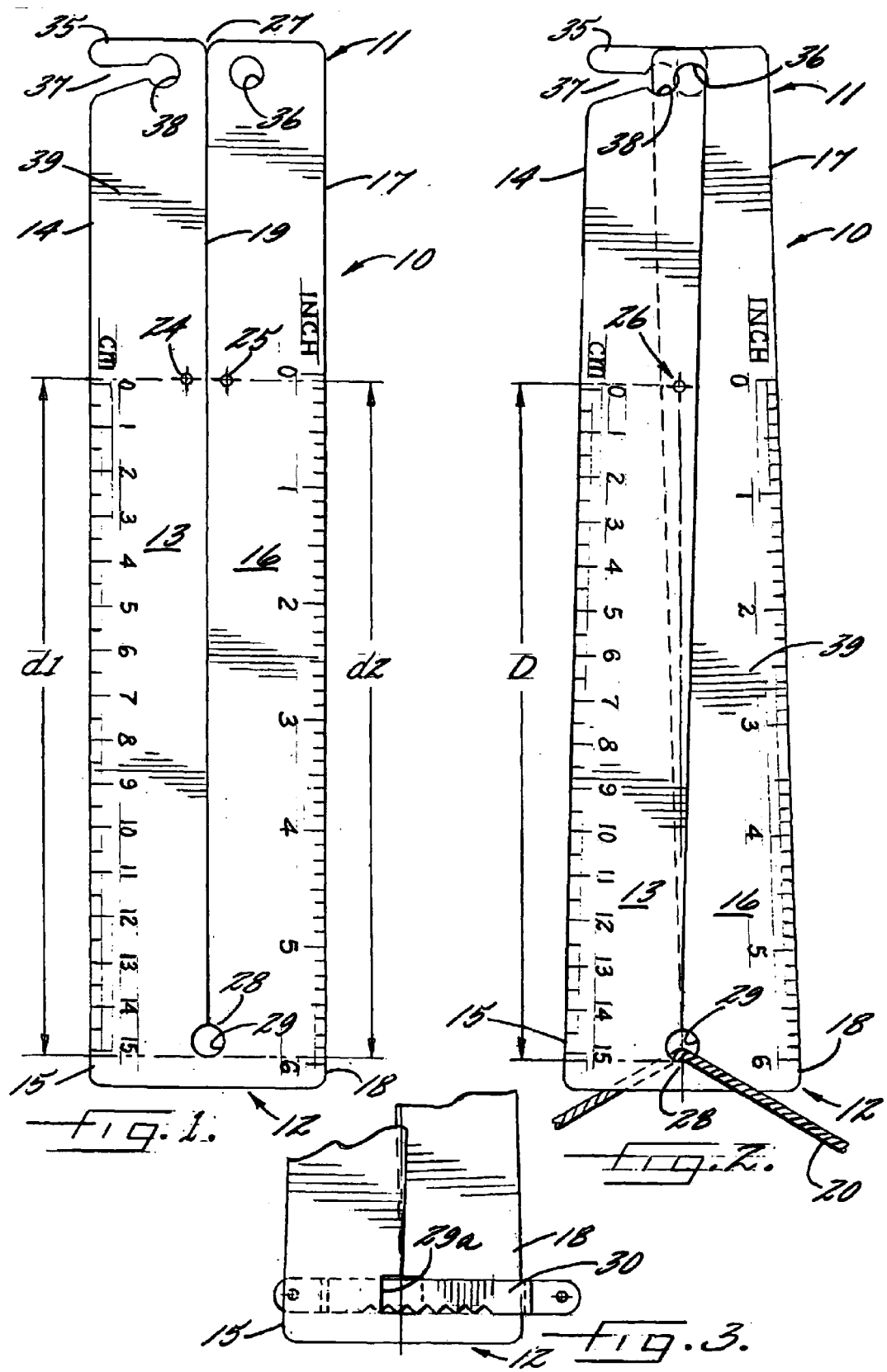

FLEXIBLE GUIDE FOR IDENTIFYING A MOUNTING HOLE

FIELD OF THE INVENTION

The invention relates to an apparatus for identifying a mounting hole on a wall surface. In particular, the invention relates to a flexible guide for marking a wall surface to identify a mounting hole for an article to be hung. The invention further relates to a method for marking a wall surface to identify a mounting hole for an article to be hung.

BACKGROUND OF THE INVENTION

Known devices used to mark the preferred location of a nail or mounting hook for securing articles on walls include strings, rulers, and levels. These known devices are typically inaccurate and cumbersome, thus forcing the operator into awkward positions when hanging, for example, picture frames. Use of these known devices also typically results in the inadvertent scratching or marking of the wall to which the article is secured. Accordingly, there is a need for a device that accurately identifies a mounting hole for an article (e.g., picture frame) that minimizes damage to the desired wall surface.

Of the known devices, Patent Application Publication Number 2002/0124426 A1 to Dewberry describes a template for positioning wall hangings. Dewberry discloses a template that defines a series of spaced-apart holes along the longitudinal axis of the body. As configured, the template relies upon a horizontal fixture (e.g., crown molding) to identify a mounting hole. Thus, there is a need for a guide capable of identifying a mounting hole without relying on a horizontal surface such as crown molding or a ceiling.

Further, the template of Dewberry is incapable of identifying a mounting hole for a frame that includes a wire support as opposed to a fixed bracket. Specifically, Newberry fails to account for the sag of a free-standing wire when the wire is placed under tension (e.g., when the frame is secured to the wall). Stated differently, Newberry fails to account for the distance the frame will shift downwards when hanging a frame by a wire. Thus, there is a need for a guide that accurately identifies the mounting hole for a frame that is suspended by a wire such that the picture will retain the desired height upon mounting.

Still further, Dewberry fails to provide a guide that is capable of supporting a frame when pre-positioning the frame against a desired wall surface. Accordingly, there is a need for a guide that will support a frame so that the operator is able to accurately pre-position the frame on the wall at a desired height.

U.S. Pat. No. 4,220,309 to Eisen et al. discloses a method and apparatus for positioning hooks or hangers on a wall. Eisen describes an elongated body having adhesive stripe on opposing sides for securing the body to the wall and for securing a frame to the body, respectively. A foldable tab is provided in the central portion of the body for supporting a wire secured to a frame. Unfortunately, the tackiness of adhesive is known to degrade over time and the tab is susceptible to failure after repeated use. In other words, over an extended period of time, the adhesive will fail to stick to the wall and will fail to fix the frame in one position. Moreover, the tab of Eisen will deform over time and fail to retain the wire of the frame. Thus, there is a need for a guide that is capable of repeated use over an extended period of time.

U.S. Pat. Nos. 5,209,449, 5,303,895, and 5,454,542 to Hart each describe devices that are secured to the back of a frame to form a hanger-frame assembly, which is then secured as a unit to a wall. The Hart references thus describe devices that require the use of an independent bracket and are incapable of being used in conjunction with a wire-mounted frame. Further, Hart discloses devices that are limited to one use. Thus, there is a need for a guide that is capable of use in conjunction with both brackets and wires.

The known devices, some of which are described above, typically incorporate a number of moving pieces and are oftentimes expensive and time consuming to manufacture. Thus there is a need for a guide that is durable and that can be economically and efficiently manufactured.

Further, known devices are somewhat bulky and typically sold as separate units apart from the frame. Thus there is a need for a guide that is substantially planar and capable of being incorporated into existing packaging (e.g., promotional envelopes or packaged with frames).

OBJECT AND SUMMARY OF THE INVENTION

It is therefore an object of the present invention to provide a guide that minimizes damage to the desired wall surface when identifying a mounting hole for an article.

Another object of the invention is the provision of a guide capable of identifying a mounting hole that is not dependent upon a nearby horizontal surface (e.g., crown molding or a ceiling) for accurate measurement.

A further object of the invention is to provide a guide that accurately identifies the mounting hole for a frame that is suspended by a wire such that the picture will retain the desired height upon mounting.

Still another object of the invention is to provide a guide capable of supporting the weight of a frame to thereby permit the user to accurately preposition the frame on the wall at a desired height.

Still another object of the invention is to provide a guide that is capable of repeated use over an extended period of time.

Another object of the invention is to provide a guide that is capable of use in conjunction with both brackets and wires.

Still yet another object of the invention is to provide a guide that is durable and that can be economically and efficiently manufactured.

Still another object of the invention is the provision of a guide that is substantially planar and capable of being incorporated into existing packaging.

The invention meets these objectives with a flexible guide that is capable of accurately identifying a mounting hole on a wall surface. In particular, the invention is a guide having a first section and a second section that are connected at one end, a means for connecting free ends of the guide when the first and second sections are flexed and extended against one another, an elongate slit having an open end and a closed end, and an opening in communication with the slit that retains a mounting device and identifies the mounting hole. Further, the first and second sections define a pair of alignment openings that correspondingly align when the first and second sections are flexed and extended against one another to thereby identify an alignment reference point for use in accurately identifying the mounting hole.

The foregoing and other objects and advantages of the invention and the manner in which the same are accomplished will become clearer based on the following detailed description taken in conjunction with the accompanying drawings in which:

BRIEF DESCRIPTION OF THE DRAWINGS

FIG. 1 is a top planar view of a preferred embodiment of the guide in an unextended (i.e., not flexed) position depicting a first section, a second section, a tab, a tab receiving opening, an elongate slit, a pair of alignment openings, and a device retaining opening.

FIG. 2 is a top planar view of a preferred embodiment of the guide in an extended (i.e., flexed) position, wherein the first and second sections of the guide are flexed and extended against one another, depicting the tab engaged by the tab receiving opening, a support device (e.g., wire) engaged by the device retaining opening, and an alignment reference opening formed by the corresponding alignment of the alignment openings.

FIG. 3 is a partial top planar view of a second end of an alternative embodiment of the guide illustrating a rectangular device retaining opening for receiving support devices other than a wire (e.g., a serrated hanger)

FIGS. 4A–7 are perspective views of a method for marking a wall surface to identify a mounting hole for an article to be hung that incorporates a preferred embodiment of the guide, wherein FIG. 4A illustrates a user sliding a wire support into the slit of the guide, FIG. 6 illustrates the wall surface bearing the alignment reference point and the mounting hole mark separated by distance D, and FIG. 7 depicts the user securing a nail into the wall at the mounting hole mark.

DETAILED DESCRIPTION OF THE INVENTION

Figure 4A:
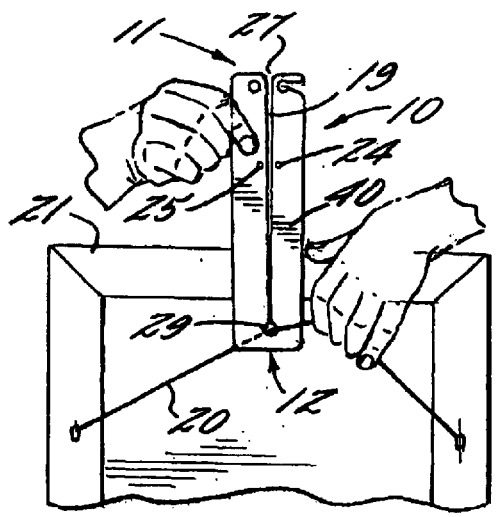

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that as used herein the term "guide" refers to a device that facilitates the identification of a reference point. The guide may be formed of flexible plastic, flexible metal, or similar material made of plastic or metal. In particular, manufacturers favor the use of one-piece flexible guides, which are readily incorporated into packaging such as envelopes or related mailers.

Those skilled in the art will also appreciate that the term "adjacent" refers to two or more, for example, elements, that have a common border or are in close proximity to one another. Nevertheless, it will be understood that adjacent may or may not imply contact, but always implies the absence of anything of the same kind in between.

Referring to FIG. 1, it will be understood that the term "portion" refers to various areas of the guide. It will be further understood by those skilled in the art that the terms "upper portion" and "lower portion", and "right portion" and "left portion", may also refer to "lower portion" and "upper portion," and "left portion" and "right portion," respectively, dependent upon the perspective of the individual viewing the guide. It will also be appreciated that the term "upper" implies the opposite of "lower", and term "right" implies the opposite of "left."

It will be understood that the terms "front" and "back" refer to the opposing faces of the guide. It will be further understood by those skilled in the art that the terms "front" and "back", may also refer to "back" and "front", respectively, dependent upon the perspective of the individual viewing the guide.

As used herein, it will be understood that the term "flexible" refers to material that is capable of being easily twisted or flexed and resuming its former shape. Stated differently, the term flexible will imply the property of resisting deformation by twisting.

It will also be understood by those of skill in the art that as used herein, the concept of an element (e.g., section) being "between" two other elements does not necessarily imply that the three elements are contiguous (i.e., in intimate contact). Rather, as used herein, the concept of one element being between two other elements is meant to describe the relative positions of the elements within the guide structure, respectively.

With reference to openings, slits, or slots in the guide, those skilled in the art will understand that the term "side" refers to the areas adjacent to an opening, slit, or slot, and extending outward therefrom in any number of directions.

For ease of reference, the term "article" as used herein will refer to a picture frame, a photograph, poster, or related item for hanging on a wall surface. Nevertheless it will be understood that the article may include any number of substantially flat or near planar articles that are not necessarily frames.

It will also be understood that the term "section" refers to the major component part of a guide and defines the major partition elements of the guide.

It will be further understood by those of skill in the art that the term "open end" refers to an end portion of, for example, an opening or slit, that is devoid of a border or a connected element. The term "closed end" refers to an end portion of, for example, an opening or slit, that includes a defined border or connected element.

As used herein, it will be understood that the term "finished" means the inclusion of printed material or other identifying indicia. The indicia may include a measuring scale, a company's logo, or instructions for using the guide to identify a mounting hole.

An overall view of a preferred embodiment of a guide for identifying a mounting hole on a surface which incorporates features of the present invention is set forth in FIG. 1. As depicted in FIG. 1, the guide 10 is preferably planar and includes a first end 11 and a second end 12. Specifically, the guide 10 includes a first section 13 having a first end 14 and a second end 15, a second section 16 having a first end 17 and a second end 18, an elongate slit 19 defined by the first and second sections, and a means for releasably connecting the respective first ends of the first and second sections of the guide. The first and second sections 13,16 of the guide 10 form substantially parallel planes. Advantageously, the flat nature of the guide 10 facilitates its incorporation into promotional mailings as well as existing packaging for frames. The guide 10 is preferably flexible and formed from polymeric material such as polyethylene, polyurethane, polypropylene, and polyester or related material to promote durability. In an alternative embodiment, the guide 10 may be formed from flexible metallic film or related flexible metal material.

The first and second sections 13,16 are preferably rectangular in shape. Nevertheless, it will be understood that the first and second sections 13,16 may be substantially trapezoidal or triangular in shape.

The first section 13 of the guide 10 defines at least one alignment opening 24 positioned between the first and second ends 14,15 of the first section. The second section 16 likewise defines at least one alignment opening 25 positioned between the first and second ends 17,18 of the second section. The alignment openings 24,25 are positioned adjacent to opposing sides of the elongate slit 19 and are preferably aligned on substantially parallel planes at a distance d1, d2, respectively, from the retainer opening 29, as will be discussed later. As discussed herein and illustrated in FIG. 2, the respective alignment openings 24,25 are configured to correspondingly align during operation of the guide 10 to thereby provide an alignment reference opening 26. See FIG. 2. The alignment reference opening 26 provides the user with an initial reference point for subsequently identifying the mounting hole 23.

Figure 4B:
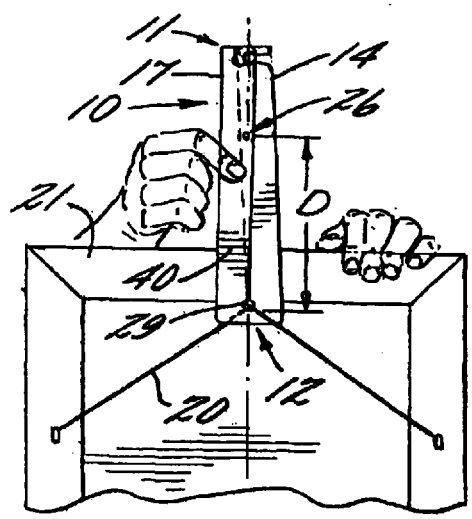
FIG. 4B depicts the user supporting the article to be hung with the guide in the flexed position.

The respective second ends 15,18 of the first and second sections 13,16 of the guide 10 are connected to one another. Accordingly, the respective first ends 14,17 or free ends of the first and second sections 13,16 are capable of being flexed and extended across (i.e., against) one another such that the first ends are substantially adjacent to one another. See FIG. 2. Stated differently, portions of the first end 11 of the guide 10 are capable of overlapping one another. During use of the guide 10 as described herein, the first ends 14,17 are flexed against and connected to one another after a wire 20—or other mounting device secured to the back of a frame 21—is positioned in the elongate slit 19. See FIGS. 2 and 4B.

The first and second sections 13,16 of the guide 10 define the elongate slit 19 having an open end 27 adjacent the respective first ends 14,17 of the first and second sections and a closed end 28 adjacent the respective second ends 15,18 of the first and second sections. As referenced above, the slit 19 is capable of receiving the mounting device 20 of the article 21 to be hung on a wall surface 22. It will be understood by those skilled in the art that the mounting device 20 may be a wire, a hook, a bracket, or any number of devices used to hang an article 21 such as a picture frame on a wall surface 22. Advantageously, the elongate slit 19 permits the user to flex the guide 10 and connect the respective first ends 14,17 of the first and second sections 13,16 such that the respective alignment openings 24,25 in the first and second sections are aligned, thus defining the alignment reference opening 26. Again, the alignment reference opening 26 is used to locate and mark the mounting hole 23.

Figure 5A:
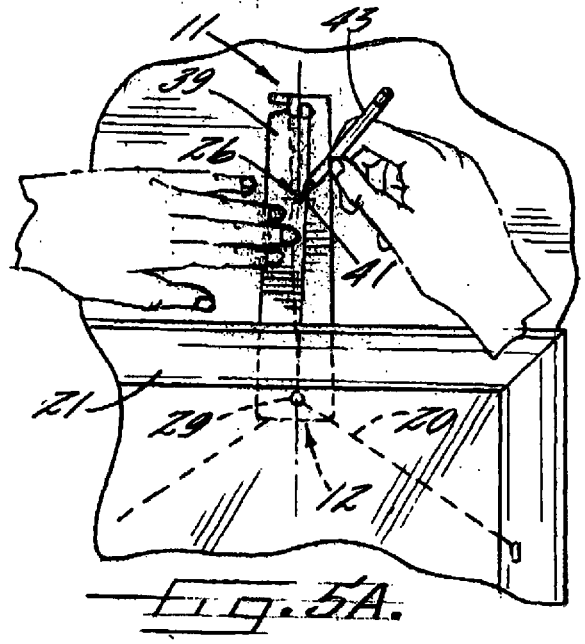
FIG. 5A illustrates the user marking the alignment reference point by extending a pencil through the alignment reference opening.

The respective second ends 15,18 of the first and second sections 13,16 define an opening 29 in communication with the slit 19. In other words, the opening 29 is positioned at the closed end 28 of the slit 19. As depicted in FIGS. 2 and 5A, the opening 29 is configured to temporarily retain the mounting device 20 (e.g., wire) of the article 21 to be hung when the guide 10 and frame are connected and lifted, to thereby place the wire under tension. In a preferred embodiment, the device retaining opening 29 is substantially circular for retaining a wire 20. See FIG. 2. It will be understood, however, that in an alternative embodiment, the device retaining opening may be a substantially rectangular opening 29a for retaining a serrated bracket 30. See FIG. 3.

The connecting means temporarily secures the respective first ends 14,17 of the first and second sections 13,16 such that the respective alignment openings 24,25 are correspondingly aligned with one another. In a preferred embodiment, the connecting means is a tab 35 integral with the first end 14 of the first section 13 of the guide 10. The tab 35 works in conjunction with an opening 36 defined by the first end 17 of the second section 16 of the guide 10. This opening 36 is referred to as the tab receiving opening. The first end 14 of the first section 13 also defines a slot 37 that is adjacent the tab 35. Structurally, the slot 37 defines one side of the tab 35 and permits the tab to engage the tab receiving opening 36.

The tab 35 is positioned substantially parallel with respect to the tab receiving opening 36. In operation, the tab 35 is aligned to engage the tab receiving opening 36 when the respective first ends 14,17 of the first and second sections 13,16 are flexed and extended to a position adjacent to one another. See FIG. 2. Stated differently, the opening 36 is configured to receive the tab 35 when the first and second sections 13,16 are flexed and extended across one another.

In a preferred embodiment of the invention, the slot 37 adjacent to the tab 35 extends from an outer edge of the first end 14 of the first section 13 toward the elongate slit 19 to a substantially circular opening 38 defined by the first end of the first section. The opening 38 defines the interior most edge of the slot 37. The diameter of the opening 38 is preferably greater than the width of the innermost portion of the slot 37. Stated differently, the innermost portion of the slot 37 immediately adjacent the opening 38 is narrower than the opening. The slot 37 is preferably triangular in shape, but it will be understood that the slot may also be trapezoidal in shape. As configured, the slot 37 and opening 38 define a keyhole shape. Accordingly, the narrowest portion of the slot 37 temporarily secures the tab 35 once the tab engages the tab receiving opening 36.

In an alternative embodiment, the connecting means may include a triangular tab defined by and integral with the first end 14 of the first section 13. Specifically, the triangular tab includes sides that extend in diverging fashion from the first end 14 of the first section 13 toward the slit 19. In the alternative embodiment, the base of the triangular tab is configured to engage a corresponding slot formed in the first end 17 of the second section 16. This type of engagement mechanism is also referred to as a "box top" closure.

In a preferred embodiment, the guide 10 is formed of a one-piece guide. The guide 10 includes a front planar side 39 and a back planar side 40. See FIGS. 4A and 4B. Preferably, the front and back planar sides 39,40 of the guide 10 are finished. For example, the front planar side 39 may include English and metric measuring scales (i.e., inches and centimeters). See FIGS. 1 and 2. In addition, the front planar side 39 may include crosshairs centered on each of the alignment openings 24,25 to facilitate the alignment of the guide 10 and an alignment reference point 41 on the wall to thereby locate the mounting hole 23. The back planar side 40 also provides sufficient advertising space for guides 10 used in promotional mailings.

Another aspect of the invention includes the use of the flexible guide 10 of the present invention in conjunction with a method for marking a wall surface 22 to identify a mounting hole 23 for an article 21 to be hung. The initial step includes supporting the article 21 (e.g., frame) to be hung with the flexible guide 10. See FIG. 4A. Specifically, the operator positions the flexible guide 10 adjacent to the backside of the article 21 and in close proximity to the particular mounting device 20 (e.g., wire or bracket) incorporated into the frame.

Next, the user prepares to connect, for example, the wire 21, and the flexible guide 10 by positioning the respective first ends 14,17 of the first and second sections 13,16 of the guide (i.e., the first end 11 of the guide) in close proximity to the mounting device 20 on the frame. Specifically, the user positions the open end 27 of the elongate slit 19 adjacent to the wire 20. The user then moves the flexible guide 10 such that the wire 20 engages the elongate slit 19. The guide 10 is advanced in a direction—either upward, downward, or sideways dependent upon the initial position of the guide relative to the wire 20—until the wire abuts the closed end 28 of the slit 19. See FIG. 4A. Stated differently, the user advances the wire 20 the length of the slit 19 until the wire is positioned in the device retaining opening 29. As connected, the user is able to lift the guide 10 and frame 21 with one hand to apply tension on the wire 20 such that the guide is capable of supporting a frame of average weight. See FIGS. 4B and 5A. Alternatively, frames of above average weight may require the user to support the frame 21 with the other hand. Test results of a preferred embodiment of the guide 10 formed from polymeric material indicate that the guide is capable of supporting approximately 40 pounds (lbs.) of weight.

Figure 6:
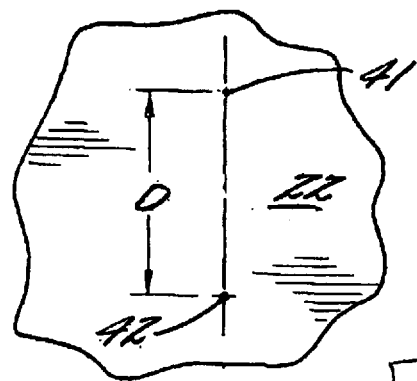

Upon connecting the guide 10 and article 21 to be hung and prior to lifting, the user releaseably secures the respective first ends 14,17 of the first and second sections 13,16 of the flexible guide to one another. See FIG. 4B. This operation secures the wire 20 in the elongate slit 19. Upon completion of this operation and as described above, the respective alignment openings 24,25 in the first and second sections 13,16 are correspondingly aligned with one another to form the alignment reference opening 26. Advantageously, the alignment openings 24,25 are spaced a sufficient distance (D) from the device retaining opening 29 such that the alignment reference opening 26 is visible when the respective first ends 14,17 of the first and second sections 13,16 are connected to one another, and the guide 10 and article 21 are positioned against the wall 22. See FIGS. 4B, 5A, and 6.

This unique feature of the guide 10 permits the user to accurately locate the alignment reference opening 26, mark an alignment reference point 41 on the wall 22 surface using the alignment reference opening 26, and then identify the mounting hole 23 with reference to the alignment reference point. If the alignment openings 24,25 are not spaced a sufficient distance from the device retaining opening 29, the alignment reference opening 26 is hidden from the user's view when the guide 10 and article 21 are positioned against the wall 22 in preparation for identifying the mounting hole 23, as described in detail below.

Next, the guide 10 and article 21 are positioned against a desired wall surface 22. See FIG. 5A. In particular, the guide 10 and article 21 are arranged against the wall surface 22 such that the guide supports the article at a desired height. Upon arranging the article 21 against the wall 22 at a desired height, the user marks the wall with visible indicia by extending an instrument 43 (e.g., pencil) through the alignment reference opening 26 to thereby identify the alignment reference point 26. The alignment reference point 26 is subsequently used to identify the mounting hole 23 for the article 21.

Upon marking the wall 22 with the alignment reference point 41, the user moves the guide 10 and article 21 away from the wall surface 22 and then removes the article from the supporting flexible guide. The user removes the guide 10 from the article 21 by disengaging the respective first ends 14,17 of the guide, sliding the wire 20 towards the open end 27 of the elongate slit 19 (or first end 11 of the guide), and then removing the wire from the slit. Stated differently, the user removes the tab 35 from the tab receiving opening 36, and slides the wire 20 out of the slit 19.

Figure 5B:
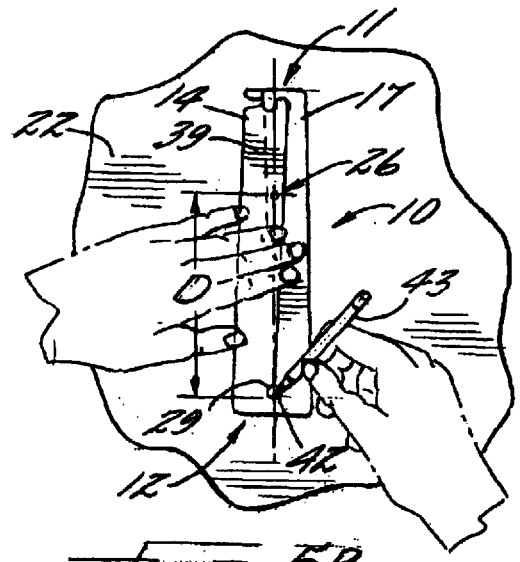
FIG. 5B depicts the user aligning the guide on the wall and marking the mounting hole by extending a pencil through the retaining opening.

In a subsequent step, the user aligns the guide 10 on the wall 22 such that the respective alignment openings 24,25 are substantially parallel to the alignment reference point 41 on the wall. See FIG. 5B. This operation may be accomplished with the guide 10 in the flexed position (i.e., first ends 14,17 connected) or unflexed position (i.e., first ends free). As referenced above, the guide 10 may include crosshair markings around the periphery of each alignment opening 24,25 to assist the user in aligning the guide with respect to the alignment reference point 41 on the wall 22. See FIGS. 1 and 2. Specifically, the user aligns the horizontal lines of the crosshair markings with the alignment reference point 41 such that the reference point is immediately adjacent and centered between the horizontal lines of the crosshair markings.

Next, the user marks the wall 22 by extending, for example, a pencil 43, through the device retaining opening 29 and places a mounting hole mark 42 on the wall immediately adjacent the lowermost side of the opening. See FIG. 5B. The resulting mark 42 identifies the preferred mounting hole 23 for any number of devices 44 used to support an article 21 on a wall surface 22 (e.g., a nail).

Alternatively, the user may align the guide 10 on the wall 22 such that the alignment reference point 41 on the wall is substantially parallel to the respective alignment openings 24,25, and immediately adjacent to the right side or left side of the guide. This step is preferably accomplished with the guide 10 in the unflexed position. As positioned, the user is able to refer to, for example, English or metric scales provided on the sides of the guide 10 when identifying the mounting hole 23. In a preferred embodiment, the guide 10 includes an English scale of six inches and a metric scale of 15 centimeters. Thus, the mounting hole 23 will be, for example, six inches (D), below the alignment reference point 41.

Figure 7:
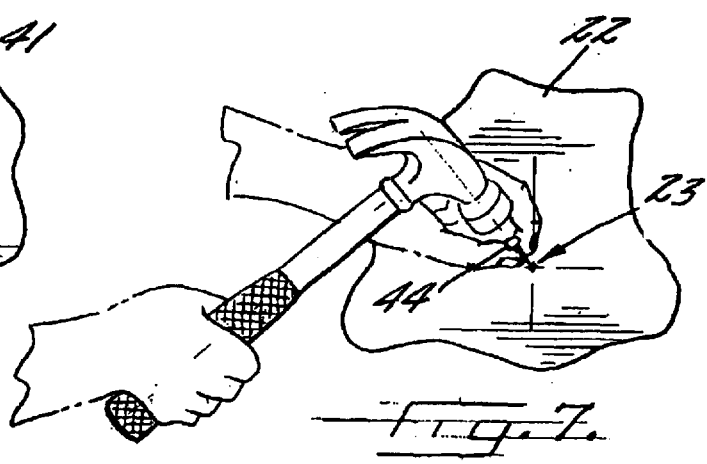

In the final steps of the preferred method, the user secures a nail 44 into the mounting hole 23 and subsequently mounts the article 21 on the wall surface 22. See FIG. 7. The upper alignment mark 41 can then be erased from the wall 22 to avoid unsightly marking.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. A flexible guide for identifying a mounting hole on a surface, said guide comprising:

a first section having a first end and a second end, said first section defining at least one opening;

a second section having a first end and a second end, said respective second ends of said first and second sections connected to one another, said second section defining at least one opening; and means for releasably connecting said respective first ends of said first and second sections such that said respective openings in said first and second sections are correspondingly aligned with one another.

2. A flexible guide according to claim 1, wherein said guide consists essentially of a one-piece guide.

3. A flexible guide according to claim 1, wherein said guide has a front planar side and a back planar side, said front and back planar sides being finished.

4. A flexible guide according to claim 1, wherein said guide is formed from polymeric material.

5. A flexible guide according to claim 1, wherein said guide is formed from a metal material.

6. A flexible guide according to claim 1, wherein said first and second sections form substantially parallel planes.

7. A flexible guide according to claim 1, wherein said first and second sections are substantially rectangular.

8. A flexible guide according to claim 1, wherein said first and second sections are substantially trapezoidal.

9. A flexible guide according to claim 1, wherein said first and second sections are substantially triangular.

10. A flexible guide according to claim 1, wherein said guide defines an elongate slit, said slit having an open end adjacent said respective first ends of said first and second sections and a closed end adjacent said respective second ends of said first and second sections.

11. A flexible guide according to claim 1, wherein said respective second ends of said first and second sections define an opening.

12. A flexible guide according to claim 11, wherein said opening defined by said respective second ends of said first and second sections is substantially circular.

13. A flexible guide according to claim 11, wherein said opening defined by said respective second ends of said first and second sections is substantially rectangular.

14. A flexible guide according to claim 1, wherein:

said first end of said second section defines an opening; and said connecting means comprises a tab integral with said first end of said first section, said tab aligned to engage said opening defined by said first end of said second section when said respective first ends of said first and second sections are flexed and extended to a position adjacent to one another.

15. A flexible guide according to claim 14, wherein:

said first end of said first section and said tab define a slot positioned adjacent said tab.

16. A flexible guide according to claim 15, wherein said slot is substantially triangular in shape.

17. A flexible guide according to claim 15, wherein said slot is substantially trapezoidal in shape.

18. An apparatus for identifying a mounting hole on a wall surface, said apparatus comprising:

a substantially planar flexible guide having a first end and a second end, said first end having portions that are capable of overlapping one another, said guide defining a slit having an open end adjacent said first end of said guide and a closed end adjacent said second end of said guide, said slit capable of receiving and temporarily retaining a mounting device of an article to be hung on the wall surface; and a tab integral with a portion of said first end of said guide;

wherein another portion of said first end of said guide defines an opening, said opening configured to receive said tab when said portions of said first end of said guide are flexed and extended to a position adjacent to one another.

19. An apparatus according to claim 18, wherein said guide is formed from polymeric material.

20. An apparatus according to claim 18, wherein said guide is formed from a metal material.

21. An apparatus according to claim 18, wherein said guide is substantially rectangular.

22. An apparatus according to claim 18, wherein said guide defines a first opening and a second opening positioned adjacent to opposing sides of said slit, said first and second openings configured to correspondingly align with one another to define an alignment reference opening when said portions of said first end of said guide are flexed and extended to a position adjacent one another to thereby permit said tab to engage said tab receiving opening.

23. An apparatus according to claim 22, wherein said first and second openings are positioned substantially parallel to one another.

24. An apparatus according to claim 18, wherein said second end of said guide defines an opening in communication with said slit, said opening configured to temporarily retain the mounting device of the article to be hung.

25. An apparatus according to claim 24, wherein said opening defined by said second end of said guide is substantially circular.

26. An apparatus according to claim 24, wherein said opening defined by said second end of said guide is substantially rectangular.

27. An apparatus according to claim 18, wherein said guide is a one-piece guide having an external planar side and an internal planar side, said external planar side being finished.

28. A one-piece flexible guide for identifying a mounting hole on a wall surface, said flexible guide comprising:

a substantially rectangular first section having a first end and a second end, said first section defining at least one opening positioned between said first and second ends of said first section;

a substantially rectangular second section having a first end and a second end, said second section defining at least one opening positioned between said first and second ends of said second section, said respective second ends of said first and second sections connected to one another; and a tab integral with said first end of said first section;

wherein said first end of said second section defines an opening for receiving said tab when said first and second sections are flexed and extended across one another;

wherein said opening in said first section and said opening in said second section are configured to correspondingly align with one another when said tab engages said tab receiving opening;

wherein said first and second sections define a slit having an open end adjacent said respective first ends of said first and second sections and a closed end adjacent said respective second ends of said first and second sections;

wherein said respective second ends of said first and second sections define an opening in communication with said slit.

29. A one-piece flexible guide according to claim 28, wherein said guide has a front planar side and a back planar side, said front and back planar sides being finished.

30. A one-piece flexible guide according to claim 28, wherein said guide is formed from polymeric material.

31. A one-piece flexible guide according to claim 28, wherein said guide is formed from a metal material.

32. A one-piece flexible guide according to claim 28, wherein said first and second sections form substantially parallel planes.

33. A one-piece flexible guide according to claim 28, wherein said opening defined by said second end of said guide is substantially circular.

34. A one-piece flexible guide according to claim 28, wherein said opening defined by said second end of said guide is substantially rectangular.

35. A method for marking a wall surface to identify a mounting hole for an article to be hung, said method comprising the steps of:

providing a flexible guide having a first end, a second end, a first section, and a second section, the first and second sections each defining at least one opening that are capable of corresponding alignment when the first and second sections of the guide are flexed and extended against one another;

supporting an article with the flexible guide; and positioning the guide and article against a desired wall surface to thereby identify a mounting hole for the article.

36. A method according to claim 35, wherein:

the first and second sections of the guide provided have respective first and second ends, the respective second ends of the first and second sections connected to one another; and the step of supporting comprises:

connecting at least a portion of the article and at least a portion of the guide such that the guide supports the article; and releaseably securing the respective first ends of the first and second sections of the flexible guide to one another such that the respective openings in the first and second sections correspondingly align with one another to thereby form an alignment reference opening.

37. A method according to claim 36, wherein:

the respective first ends of the first and second sections of the flexible guide provided include a means for releasably connecting the first ends; and the step of releasably securing comprises flexing the first and second sections of the guide against one another so that the connecting means connects the respective first ends of the guide.

38. A method according to claim 35, wherein the step of positioning the guide comprises the steps of:

arranging the flexible guide and article against the desired wall surface such that the guide supports the article at a desired height; and marking the wall with visible indicia by extending an instrument through the correspondingly aligned openings in the first and second sections to thereby identify an alignment reference point for identifying the mounting hole.

39. A method according to claim 35, wherein:

the second end of the guide provided defines an opening spaced apart from the respective openings each defined by the first and second sections; and the step of positioning further comprises the steps of:

removing the article from the supporting flexible guide;

aligning the guide on the wall such that the respective openings defined by the first and second sections are substantially parallel to the alignment reference point on the wall; and marking the wall with visible indicia to thereby identify the mounting hole.

40. A method according to claim 39, wherein the step of marking comprises extending an instrument through the opening defined by the second end of the guide.

41. A method according to claim 39, wherein the step of marking comprises extending an instrument against the wall at an edge of the guide and parallel to the opening defined by the second end of the guide.

42. A method according to claim 35, further comprising the steps of:

securing a nail into the mounting hole; and mounting the article on the wall surface, all performed after steps of positioning the guide and article against the desired wall surface.

* * * * *